United States Patent [19]

Isono et al.

[11] Patent Number: 5,600,122

[45] Date of Patent: Feb. 4, 1997

[54] STRUCTURE OF CARD INSERTION PORT AND METHOD OF MOUNTING CARD INSERTION PORT MEMBER

[75] Inventors: Fumihisa Isono; Hiroshi Uemura; Takashi Ayabe, all of Tokyo, Japan

[73] Assignee: Tamura Electric Works Ltd., Tokyo, Japan

[21] Appl. No.: 372,028

[22] Filed: Jan. 12, 1995

[30]  Foreign Application Priority Data

Jan. 14, 1994 [JP] Japan .................................. 6-014984

[51] Int. Cl.⁶ .................................................. G06K 13/06
[52] U.S. Cl. ........................................ 235/483; 235/485
[58] Field of Search .................................. 235/483, 484, 235/485, 486, 379, 383, 384, 385, 386; 379/143, 144, 145

[56]  References Cited

U.S. PATENT DOCUMENTS

| | | | |
|---|---|---|---|
| 4,138,059 | 2/1979 | Endoh | 235/483 |
| 4,837,814 | 6/1989 | Yoshino | 379/144 |
| 4,847,475 | 7/1989 | Watabe | 235/483 |
| 4,907,257 | 3/1990 | Asano | 379/144 |
| 4,945,558 | 7/1990 | Deaville | 379/144 |
| 4,974,257 | 11/1990 | Ibanez | 379/143 |

FOREIGN PATENT DOCUMENTS

| | | |
|---|---|---|
| 58-10268 | 1/1983 | Japan . |
| 1243197 | 9/1989 | Japan . |

*Primary Examiner*—Donald T. Hajec
*Assistant Examiner*—Karl Frech
*Attorney, Agent, or Firm*—Blakely Sokoloff Taylor & Zafman

[57]  ABSTRACT

A structure of a card insertion port includes a card reader, an insertion port plate, and a coupling portion. The card reader is incorporated in an apparatus main body and reads/writes information from and on a card. The card reader has a slit-like card intake port arranged to oppose a front case of the apparatus main body. The insertion port plate is formed to be physically separate from the card intake port and mounted to an opening in the front case. The insertion port plate has a slit-like card insertion port extending from a front surface to a rear surface of the front case and is closely opposite to the card intake port. The coupling portion couples the card insertion port and the card intake port, thereby constituting a card intake path extending from the card insertion port to the card intake port. A method of mounting a card insertion port member is also provided.

6 Claims, 8 Drawing Sheets

STRUCTURE OF CARD INSERTION PORT AND METHOD OF MOUNTING CARD INSERTION PORT MEMBER

BACKGROUND OF THE INVENTION

The present invention relates to a structure of a card insertion port employed in an equipment, e.g., a card type public telephone set, that utilizes a card, and a method of mounting a card insertion port member.

Generally, in the card insertion port of a public telephone set used for performing speech communication by inserting a prepaid card (to be referred to as a card hereinafter) that records value information of a prepaid amount, a card intake port is formed at the distal end portion of a card reader incorporated in the public telephone set, and a card insertion port member, in which a card insertion port aligned with the card intake port is formed, is directly mounted to the distal end portion of the card reader. The card reader is mounted in the public telephone set such that the card insertion port is exposed to the outside through the opening of the front case of the public telephone set.

However, in the conventional structure of the card insertion port described above, since the card insertion port member is directly mounted to the card reader, when an impact is applied to the card insertion port exposed outside the public telephone set, the impact acts not only on the card insertion port member but also the card reader main body. If the card reader is partly damaged or broken by this impact, the entire card reader must be exchanged, which requires an extra maintenance cost. Also, since a new card reader must be mounted by removing the damaged card reader from the public telephone set, the exchange operation is cumbersome.

SUMMARY OF THE INVENTION

It is an object of the present invention to provide a structure of a card insertion port which decreases a maintenance cost, and a method of mounting a card insertion port member.

It is another object of the present invention to provide a structure of a card insertion port which can be exchanged easily, and a method of mounting a card insertion port member.

In order to achieve the above objects, according to an aspect of the present invention, there is provided a structure of a card insertion port, comprising a card reader, incorporated in an apparatus main body, for reading/writing information from/on a card, the card reader having a slit-like card intake port arranged to oppose a front case of the apparatus main body, an insertion port member formed to be physically separate from the card intake port and mounted to an opening portion of the front case, the insertion port member having a slit-like card insertion port extending from a front surface to a rear surface of the front case and being closely opposite to the card intake port, and a coupling portion for coupling the card insertion port and the card intake port, thereby constituting a card intake path extending from the card insertion port to the card intake port.

DESCRIPTION OF THE PREFERRED EMBODIMENT

Figure 1A:
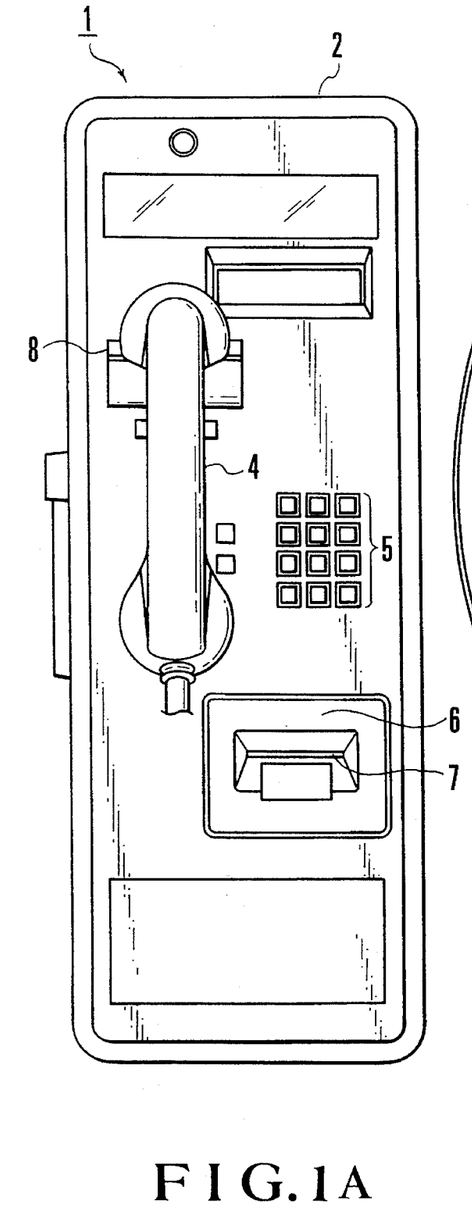
FIG. 1A is a front view of a card type public telephone set which employs the structure of a card insertion port according to the present invention.
Figure 1B:
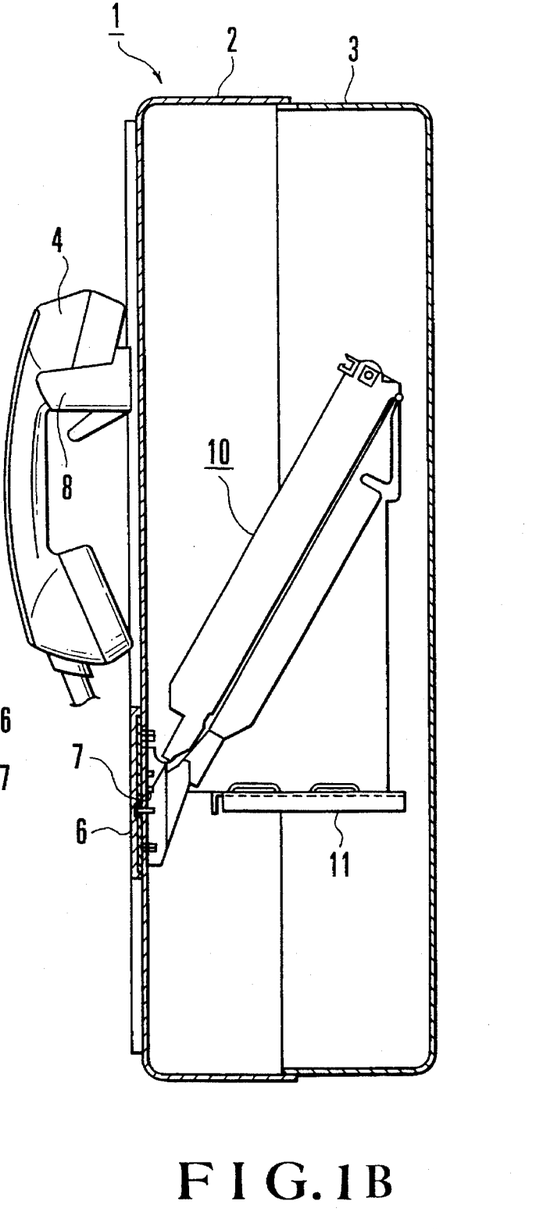
FIG. 1B is a sectional view of the card type public telephone set shown in FIG. 1A.

A preferred embodiment of the present invention will be described with reference to the accompanying drawings. Referring to FIGS. 1A and 1B, reference numeral 1 denotes a card type public telephone set which uses a prepaid card (to be referred to as a card hereinafter) on which value information corresponding to a prepaid amount is magnetically recorded. The card type public telephone set 1 is constituted by a separable housing consisting of a front case 2 and a rear case 3. A hanger 8 to which a handset 4 can be hooked, and dial buttons 5 used for inputting a dial number are disposed on the front surface portion of the front case 2. A rectangular insertion port plate 6 having a slit-like card insertion port 7 is mounted to an opening (not shown) of the front case 2. The card insertion port 7 is formed to extend through the front and rear surface sides of the front case 2, so that a card inserted into the public telephone set 1 can be taken into its interior. A conventionally known card reader 10 is arranged in the housing of the public telephone set 1 through brackets 11 such that its rear portion is inclined obliquely upward. The card reader 10 incorporates a magnetic head (not shown) for reading/writing value information from/on a card inserted through the card insertion port 7.

Figure 5:
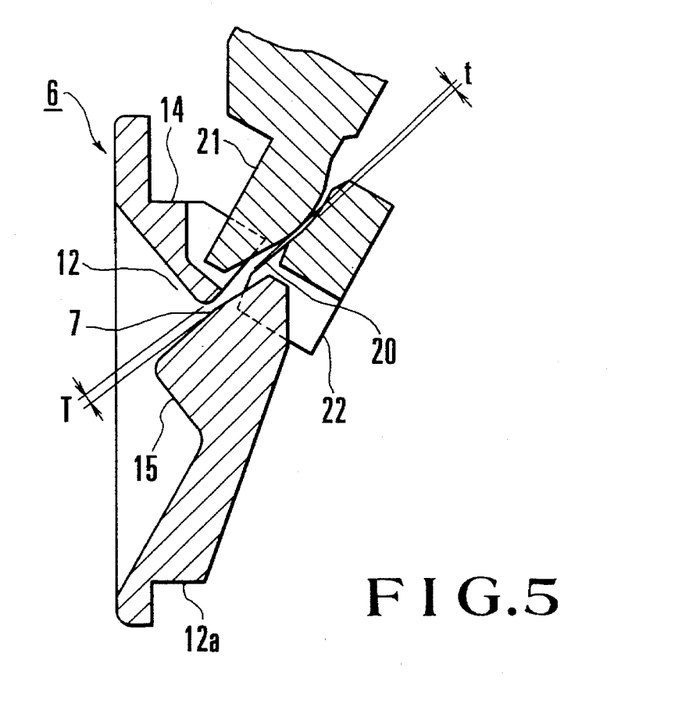
FIG. 5 is a sectional view taken along the line V—V in FIG. 4.

A recessed fitting portion 12 having a W-shaped longitudinal section is provided at substantially the center of the front surface portion of the insertion port plate 6, as shown in FIG. 5. The card insertion port 7 is formed in the upper side of the bottom portion of the recessed fitting portion 12 to incline obliquely upward. A stepped projecting portion 12a corresponding to the recessed fitting portion 12 is formed on the rear surface portion of the insertion port plate 6, and a frame-like shallow recessed fitting portion 13 is formed around the projecting portion 12a. A plurality of guide pieces 14 and 15 constituting comb-shaped members are provided above and below the card insertion port 7 in a staggered manner to vertically sandwich it. Guide surfaces 14a and 15a of the guide pieces 14 and 15 have fan-like shapes widened toward their distal ends and define an angle β. Screws 16 are buried in the four corners of the rear surface portion of the insertion port plate 6. A pair of dowels or positioning pins 17 are provided upright on the two side portions of the recessed fitting portion 12. A pair of recessed fitting portions 18 are formed under the dowels 17.

Figure 6:
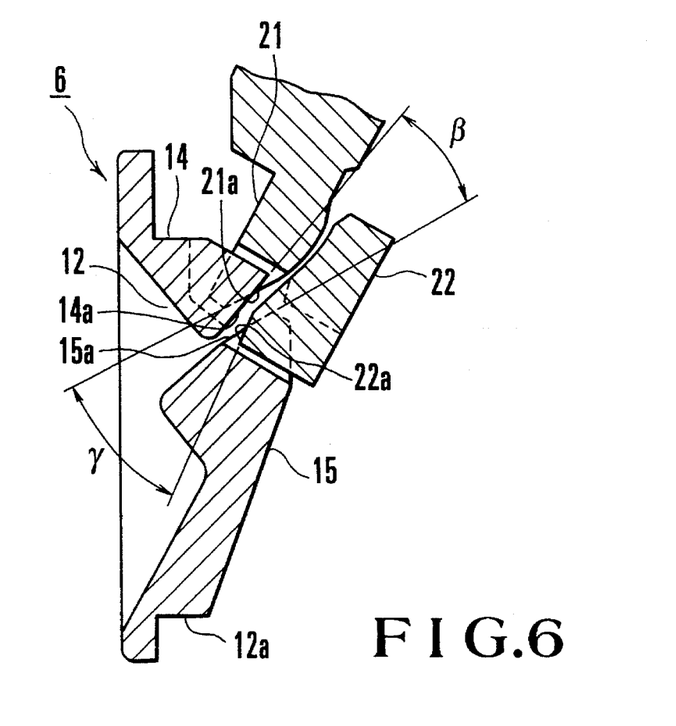
FIG. 6 is a sectional view taken along the line VI—VI in FIG. 4.

A slit-like card intake port 20 is formed in the distal end portion of the card reader 10. A card convey path, on which a magnetic head (not shown) is disposed, is provided in the card reader 10 communicating with the card intake port 20. Guide pieces 21 and 22 constituting comb-shaped members are provided above and below the card intake port 20 in a staggered manner to sandwich it. Guide surfaces 21a and 22a of the guide pieces 21 and 22 have fan-like shapes widened toward their distal ends and define an angle γ, as shown in FIG. 6.

Figure 2:
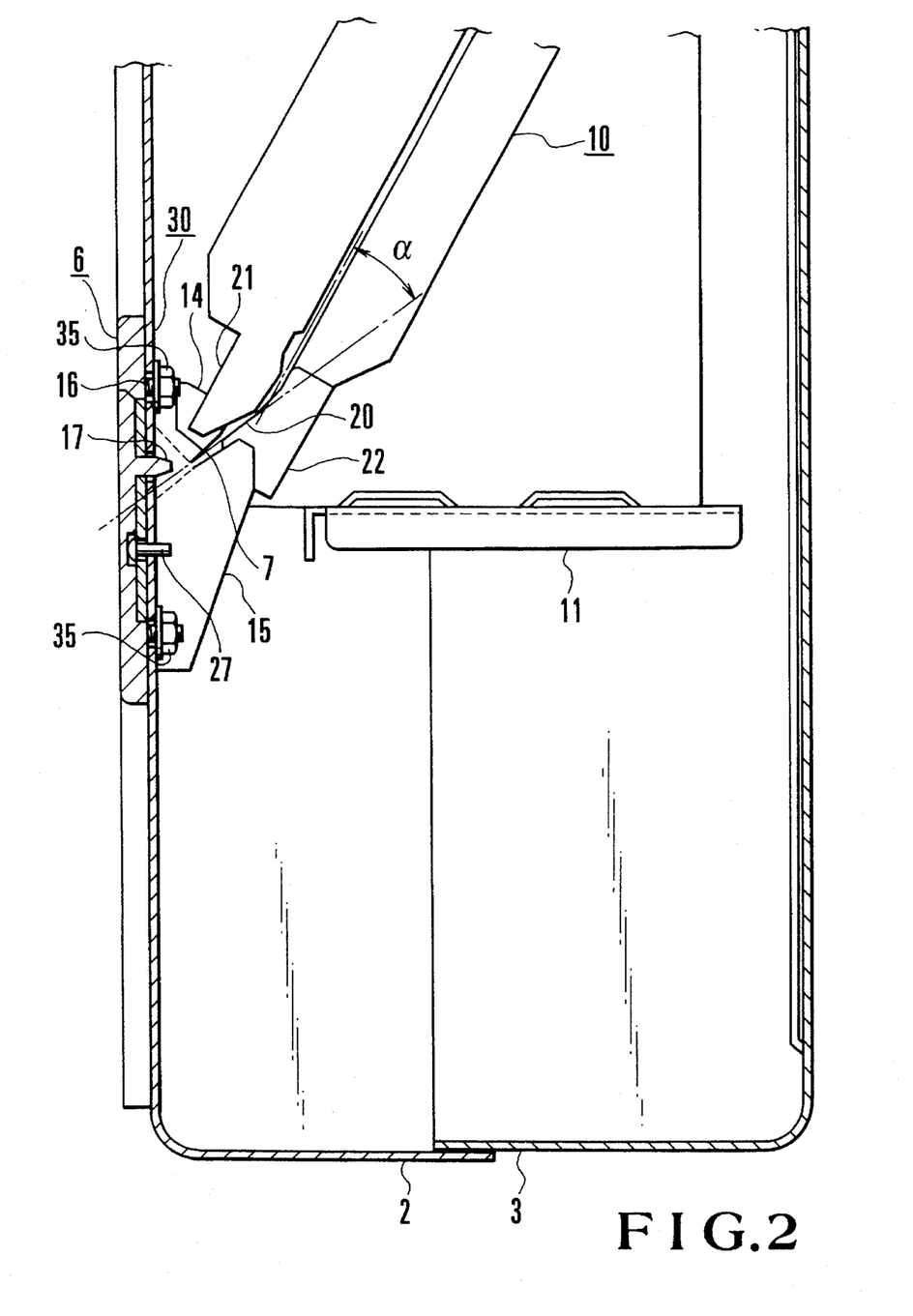
FIG. 2 is a sectional view of the main part of the card type public telephone set shown in FIG. 1A.
Figure 3A:
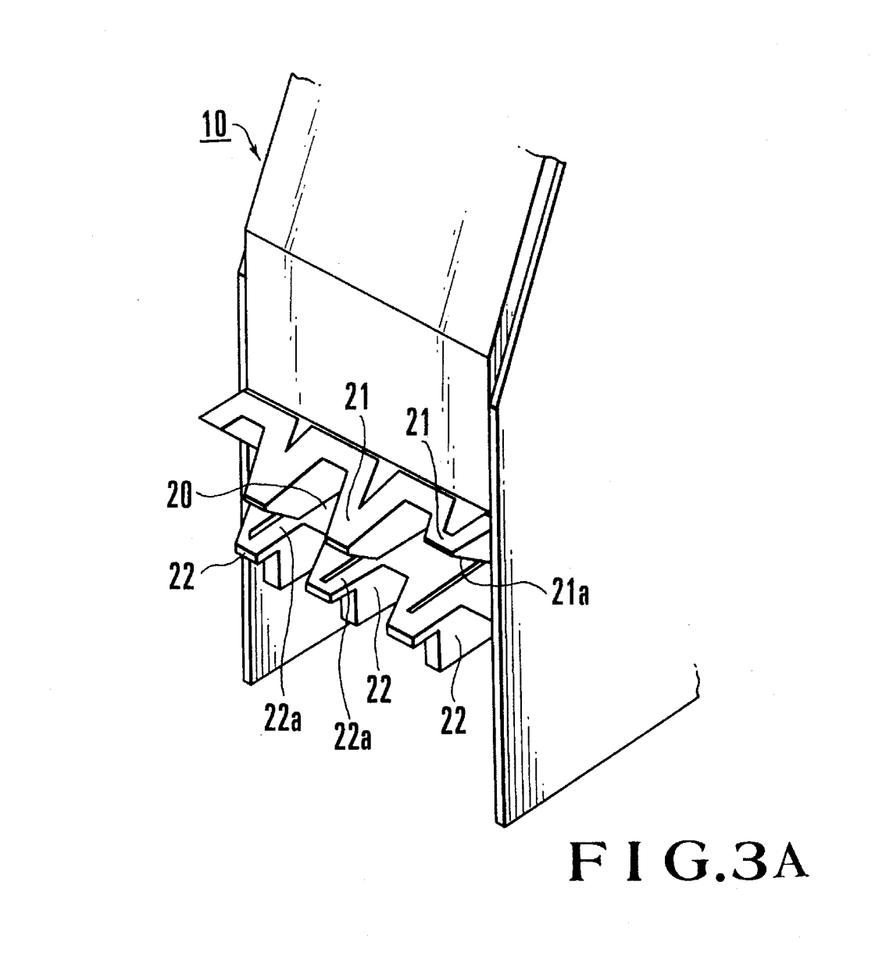
FIG. 3A is a perspective view of the main part of the card type public telephone set shown in FIG. 1A when viewed from the front side of the card reader.
Figure 3B:
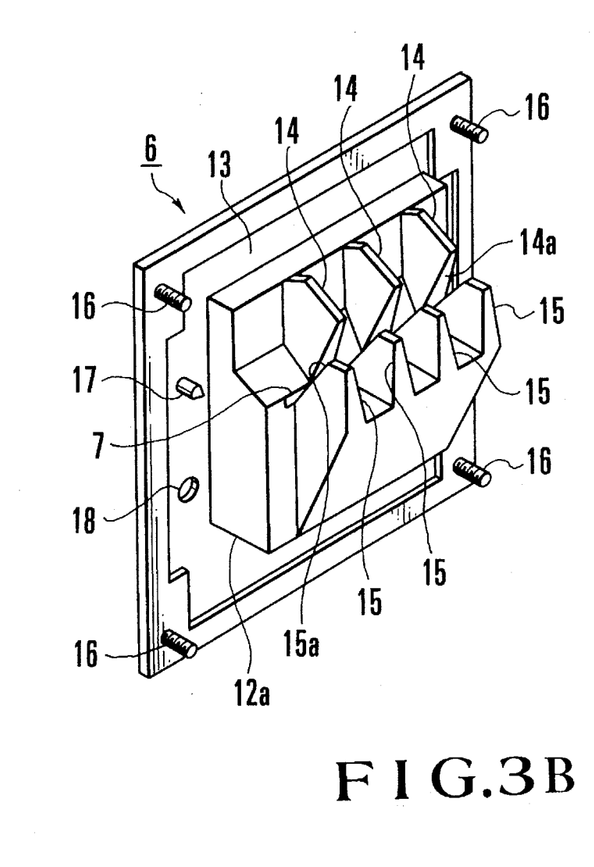
FIG. 3B is a perspective view Of the main part of the card type public telephone set shown in FIG. 1A when viewed from the rear side of the insertion port.
Figure 4:
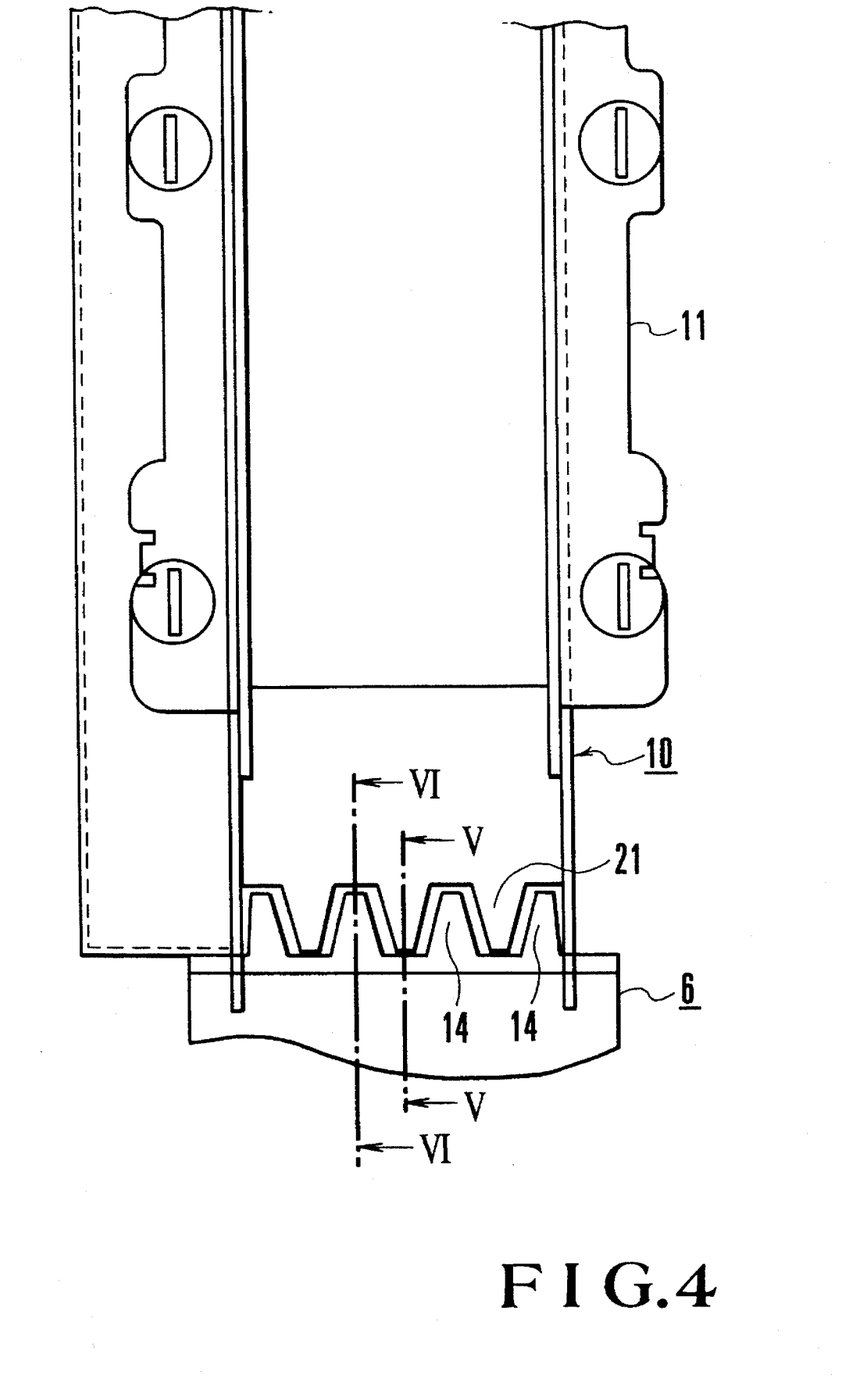
FIG. 4 is a plan view of the main part of the card type public telephone set shown in FIG. 1.

When the insertion port plate 6 is mounted to the opening of the front case 2 in a manner to be described later, the guide pieces 21 and 22 of the card intake port 20 mesh and engage with the guide pieces 14 and 15, respectively, of the card insertion port 7, to constitute a coupling portion, thereby forming a card intake path. The card convey path of the card reader 10 is inclined further obliquely upward with respect to the card intake path of the card insertion port 7 by an angle α, as shown in FIG. 2. In other words, when a card is inserted in the card insertion port 7, it is conveyed along the card intake path of the coupling portion, is switched upward at the card intake port 20 by the angle α, and is taken into the card reader 10. As shown in FIG. 5, a minimum gap T between the guide pieces 14 and 15 including the card insertion port 7 and a minimum gap t between the guide pieces 21 and 22 of the card intake port 20 satisfy T>t. Note that t is set to be slightly larger than the thickness of the card.

In this manner, the card insertion port plate 6 is separated from the card reader 10, and the comb-shaped guide pieces 14 and 15, and 21 and 22 constituting the card intake path are provided above and below the card insertion port 7 and the card intake port 20, respectively, such that the guide pieces 14 and 15 oppose the guide pieces 21 and 22, respectively. Therefore, the intake angle α can be freely set with respect to the card insertion angle by adjusting the angle of the coupling portion, and the convey path need not be arcuated in the card reader, unlike in the conventional card reader, thus simplifying the structure of the card reader. The mounting angle of the card reader 10 can be set in accordance with the mounting space in the public telephone set 1, thus effectively utilizing the space. When the card reader 10 is inclined backward, as in this embodiment, the depth of the public telephone set 1 can be decreased. Also, the insertion angle of the card insertion port 7 can be selected to such a value that facilitates insertion of a card.

Since the guide pieces 14 and 15, and 21 and 22 are comb-shaped members, even if the card insertion port plate 6 is mounted with a slight displacement in the lateral direction, card conveyance will not be hindered. Since the guide surfaces 14a and 15a, and 21a and 22a have fan-like shapes widened toward their distal ends and define the angles β and γ, respectively, a card will be smoothly conveyed without being caught by these guide surfaces. Even if the insertion port plate 6 is mounted with a slight displacement in the vertical direction, card conveyance will not be hindered. Since the minimum gap T between the guide pieces 14 and 15, and the minimum gap t between the guide pieces 21 and 22 satisfy T>t, a card inserted in the card insertion port 7 is taken into the card intake path without being caught. Once the card is taken, it is taken into the card reader 10 through the card intake port 20 without being offset in the direction of thickness of the card. Thus, smooth conveyance in the card convey path is guaranteed, and read/write errors in the magnetic head are decreased.

Figure 7:
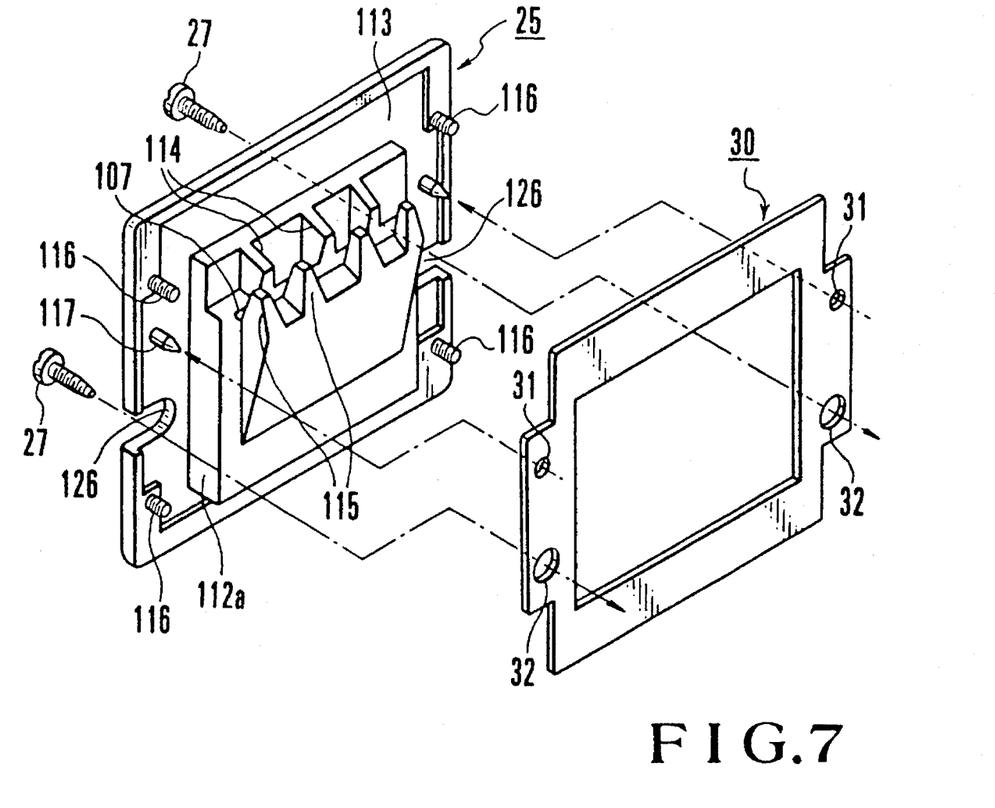
FIG. 7 is a perspective view showing the relationship between a master insertion port plate and a mediation plate.

A method of mounting the insertion port plate 6 described above to the front case 2 by using a master insertion port plate 25 shown in FIG. 7 will be described. The master insertion port plate 25 is temporarily used to align the insertion port plate 6 with the card intake port 20 of the card reader 10, and has the same shape, structure and size as those of the insertion port plate 6 except for one point. The only difference between the master insertion port plate 25 and the insertion port plate 6 is that U-shaped notches 126 are formed in the master insertion port plate 25 at positions corresponding to the recessed fitting portions 18 of the insertion port plate 6. Reference numeral 30 denotes a positioning mediation plate. A pair of holes 31 engageable with positioning pins 117 of the master insertion port plate 25, and a pair of mounting ports 32 corresponding to the notches 126 are formed in the positioning mediation plate 30. The mounting ports 32 are clearance holes for screws 27. Reference numeral 112a denotes a projecting portion; 113, a recessed fitting portion; 114 and 115, guide pieces; and 116, screws.

Figure 8A:
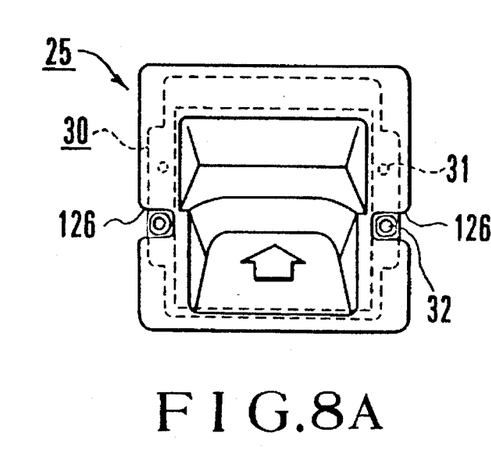
FIGS. 8A and 8B are front and sectional views, respectively, of a state wherein the mediation plate is applied to the master insertion port plate.
Figure 8B:
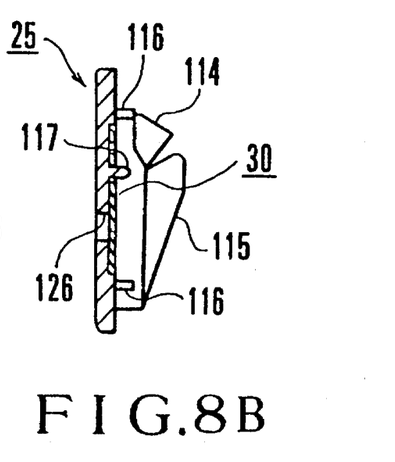
Figure 9A:
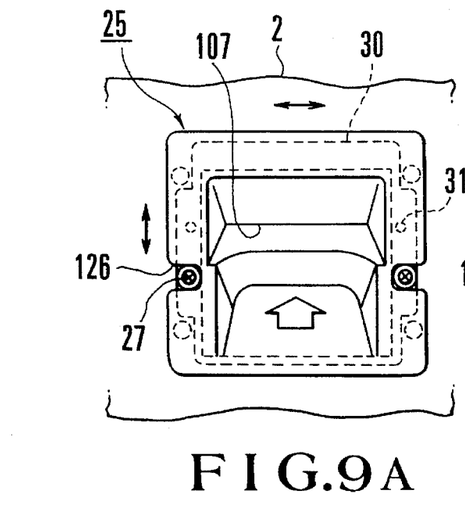
FIGS. 9A and 9B are front and sectional views, respectively, of a state wherein the mediation plate is mounted to a front case by using the master insertion port plate.
Figure 9B:
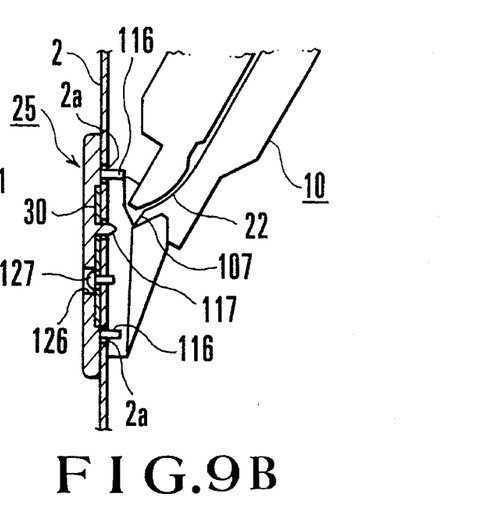

First, the holes 31 of the positioning mediation plate 30 are fitted on the positioning pins 117 of the master insertion port plate 25, and the positioning mediation plate 30 is placed on the recessed fitting portion 113 of the master insertion port plate 25, as shown in FIGS. 8A and 8B. In this state, the screws 116 are inserted into clearance mounting holes 2a in the front case 2 from the outside of the public telephone set 1 such that a card insertion port 107 of the master insertion port plate 25 is aligned with the card intake port 20 of the card reader 10 which has been already mounted in the public telephone set 1 when the front case 2 is closed, as shown in FIGS. 9A and 9B, thereby temporarily mounting the master insertion port plate 25 to the front case 2.

A card is inserted into the card insertion port 107 of the temporarily mounted master insertion port plate 25, and the master insertion port plate 25, on which the positioning mediation plate 30 is fixed, is slightly moved vertically and laterally during insertion of the card, thereby adjusting the master insertion port plate 25 to such a position that allows smooth insertion of the card. When the positions of the mounting ports 32 of the positioning mediation plate 30 are determined, the screws 27 are screwed into the front case 2 from its front surface side through the notches 126 and the mounting ports 32, thereby fixing only the positioning mediation plate 30 to the front case 2. In this case, since the mounting ports 32 are clearance holes for the screws 27, the positioning mediation plate 30 is fixed to the front case 2 in the position-adjusted state. Thus, the position of the card insertion port 107 with respect to the card intake port 20 of the card reader 10, which is adjusted by the master insertion port plate 25, is determined by the positioning mediation plate 30.

Figure 10:
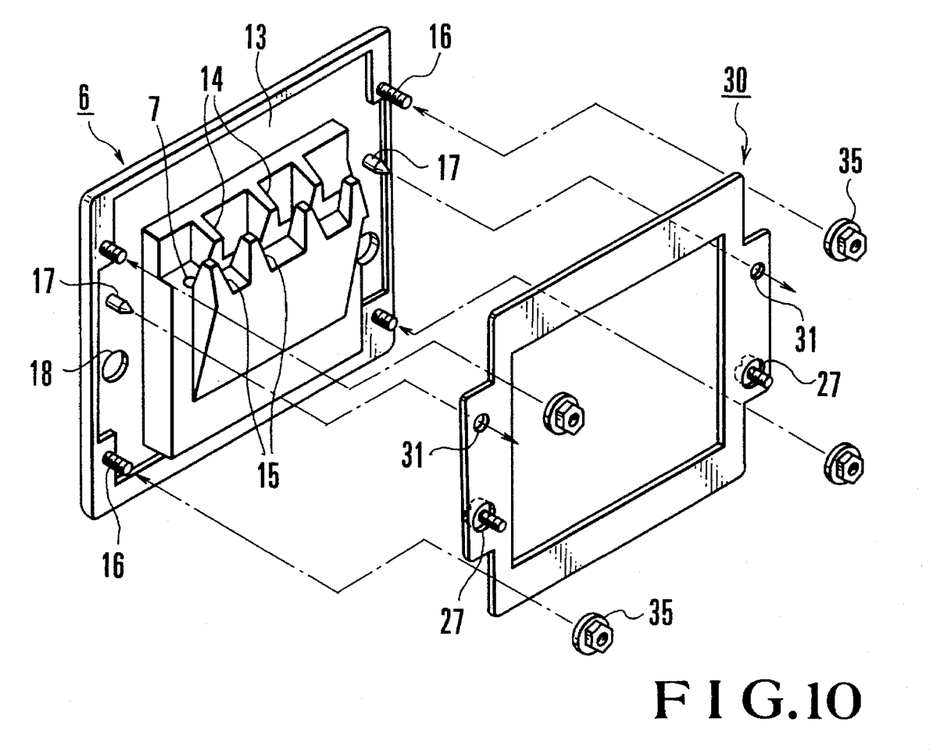
FIG. 10 is a perspective view showing the relationship between the insertion port plate and the mediation plate.
Figure 11A:
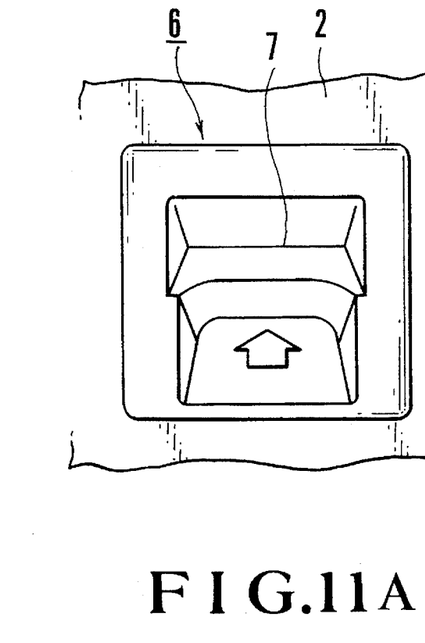
FIGS. 11A and 11B are front and sectional views, respectively, of a state wherein the insertion port plate is mounted to the front case through the mediation plate.
Figure 11B:
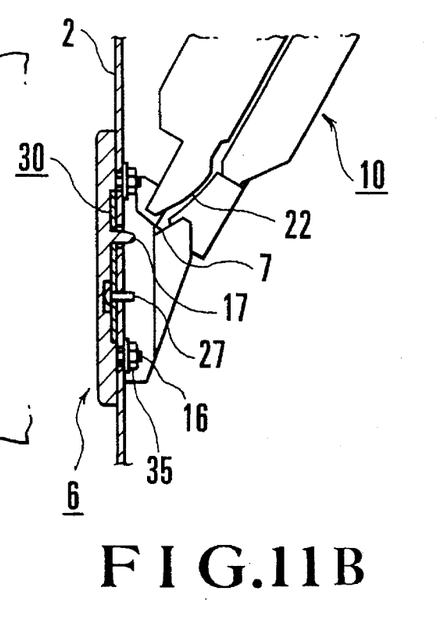
Figure 12:
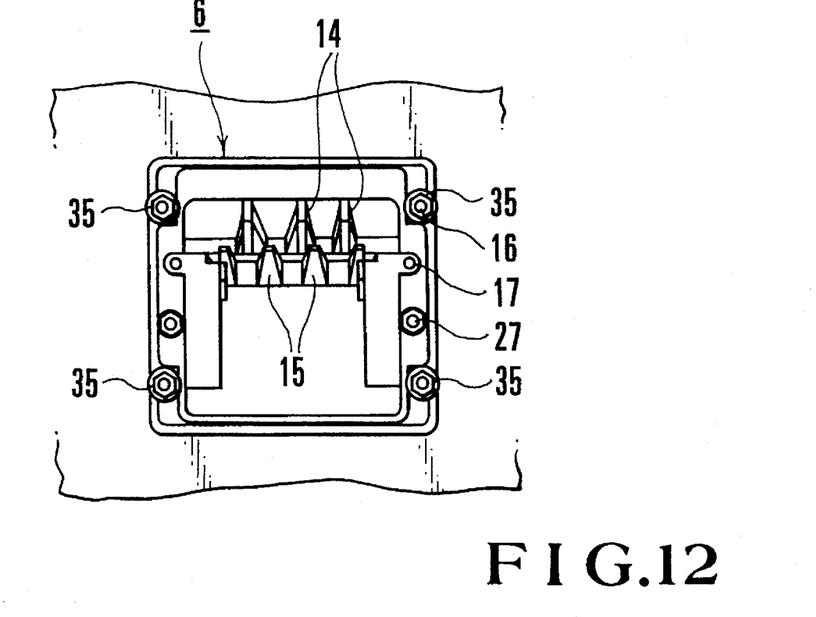
FIG. 12 is a rear view of a state wherein the insertion port plate is mounted to the front case through the mediation plate.

The screws 116 are removed from the mounting holes 2a of the front case 2, and the master insertion port plate 25 is removed from the positioning mediation plate 30. Subsequently, the positioning pins 17 of the insertion port plate 6 are inserted into the holes 31 of the positioning mediation plate 30 fixed to the front case 2, as shown in FIGS. 10, 11A, and 11B, thereby placing the insertion port plate 6 on the positioning mediation plate 30. At this time, since alignment with the card intake port 20 of the card reader 10 has already been performed by the master insertion port plate 25, the card insertion port 7 of the placed insertion port plate 6 is also aligned with the card intake port 20. In this state, the front case 2 is opened, and flange nuts 35 are threadably engaged, from the inner side of the front case 2, with the screws 16 screwed in the mounting holes 2a, thereby mounting the insertion port plate 6 to the front case 2, as shown in FIG. 12.

Since alignment with the card intake port 20 of the card reader 10 is completed in this manner during the manufacture by the positioning mediation plate 30 fixed to the front case 2, when the insertion port plate 6 is to be exchanged during maintenance and inspection, positioning adjustment with the card intake port 20 is unnecessary, so that the exchange operation can be performed within a short period of time.

As has been described above, according to the present invention, since the card insertion port member is separate from the card reader, even if an impact is applied to the card insertion port member, the impact does not act on the card reader main body, so that the card reader will not be partly damaged or broken. Thus, only the card insertion port member need be exchanged, thereby decreasing the maintenance cost.

The comb-shaped guide pieces are provided above and below the coupling portion of the card insertion port member and the card intake port of the card reader such that they oppose each other to define a card intake path. Thus, a positional error of the coupling portion in the lateral direction can be absorbed, thereby facilitating mounting adjustment while absorbing a manufacturing error. Since the card convey direction at the coupling portion can be freely changed, the degree of freedom in mounting angle of the card reader is increased, so that the mounting space can be effectively utilized. Also, the degree of freedom in insertion angle of a card is also increased, so that card insertion becomes easy, thereby providing an easy-to-use public telephone set.

Since the opposing guide surfaces of pairs of guide pieces have fan-like shapes widened toward their distal ends, a card is preventing from being caught by the coupling portion to enable smooth card reception. Also, a vertical error in the coupling portion can be absorbed, thereby facilitating mounting adjustment while absorbing a manufacturing error.

Since the gap between the upper and lower guide pieces of the card insertion port is set to be larger than the gap between the upper and lower guide pieces of the card intake port, a card can be smoothly inserted and, after being inserted, can be taken in by the card reader without offset. Therefore, card conveyance can be smoothly performed, and read/write error in the head is decreased.

Since the card insertion port member is mounted through the positioning mediation member, alignment between the card insertion port member and the positioning operation is unnecessary upon exchange of the card insertion port member, thereby facilitating exchange operation of the card insertion port member in maintenance and inspection.

Since the positioning mediation member can be fixed from the front surface of the front case, the positioning mediation member can be positioned without opening and closing the front case, so that the operability is improved, thereby reducing operation time.

What is claimed is:

1. A structure of a card insertion port, comprising:
   a card reader, incorporated in an apparatus main body, for reading/writing information from/on a card, said card reader having a slit-like card intake port arranged to oppose a front case of said apparatus main body;
   a card insertion port formed to be physically separate from the card intake port and mounted to an opening portion of said front case, said insertion port having a slit-like card insertion port extending from a front surface to a rear surface of said front case and being closely opposite to the card intake port;
   a coupling portion for coupling the card insertion port and the card intake port, wherein said coupling portion includes a pair of opposing first comb-shaped guide pieces coupled to the card intake port and the card insertion port, and formed to sandwich the card insertion port opposite to the card intake port, and a pair of opposing second comb-shaped guide pieces formed to sandwich the card intake port opposite to the card insertion port, said first and second comb-shaped guide pieces meshing and engaging with each other to constitute a card intake path which extends from the card insertion port to the card intake port.

2. A structure according to claim 1, wherein said first and second guide pieces are formed in a staggered manner.

3. A structure according to claim 1, wherein said first guide pieces define a gap including the card insertion port, which is larger than a gap defined by said second guide pieces.

4. A structure according to claim 1, wherein said coupling portion aligns the card insertion port with the card intake port in vertical and horizontal directions, and changes a card insertion angle of the card insertion port to a card intake angle of the card intake port.

5. A structure according to claim 4, wherein said card reader is provided in said apparatus main body obliquely at an angle larger than the card insertion angle of the card insertion port such that a rear portion thereof is located at a level higher than that of a front portion thereof, and a card supplied from the card insertion port is switched upward through said coupling portion and taken in by the card insertion port.

6. A structure of a card insertion port, comprising:
   a card reader, incorporated in an apparatus main body, for reading/writing information from/on a card, said card reader having a slit-like card intake port arranged to oppose a front case of said apparatus main body;
   a card insertion port formed to be physically separate from the card intake port and mounted to an opening portion of said front case, said insertion port member having a slit-like card insertion port extending from a front surface to a rear surface of said front case and being closely opposite to the card intake port;
   a coupling portion for coupling the card insertion port and the card intake port, wherein said coupling portion includes a pair of opposing first fan-shaped guide pieces formed to sandwich the card insertion port opposite to the card intake port, and a pair of opposing second fan-shaped guide pieces formed to sandwich the card intake port opposite to the card insertion port, said first and second fan-shaped guide pieces widening towards the distal ends thereof, meshing and engaging with each other to constitute a card intake path which extends from the card insertion port to the card intake port.

* * * * *